May 6, 1941.　　　O. VIERLING ET AL　　　2,240,728

STEREO CAMERA

Filed Nov. 17, 1938　　　3 Sheets-Sheet 1

Inventors
Otto Vierling
Fritz Köber

May 6, 1941.  O. VIERLING ET AL  2,240,728
STEREO CAMERA
Filed Nov. 17, 1938  3 Sheets-Sheet 2
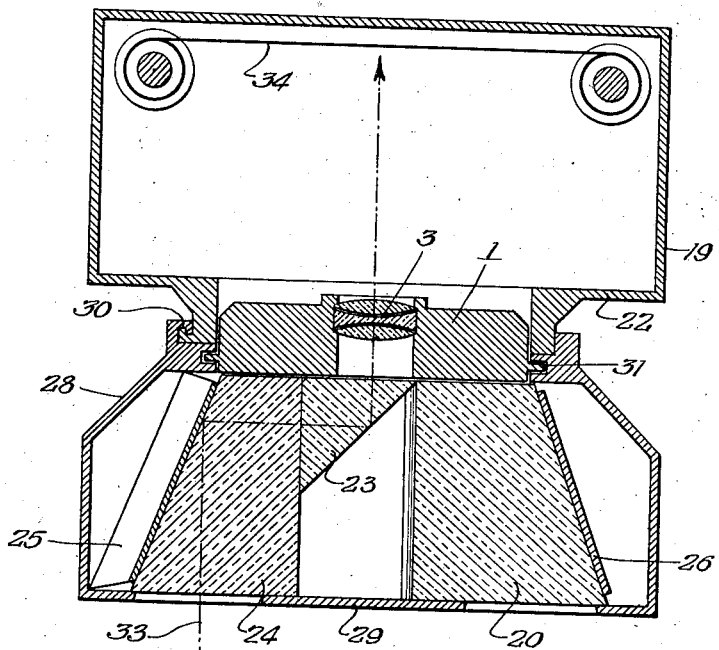
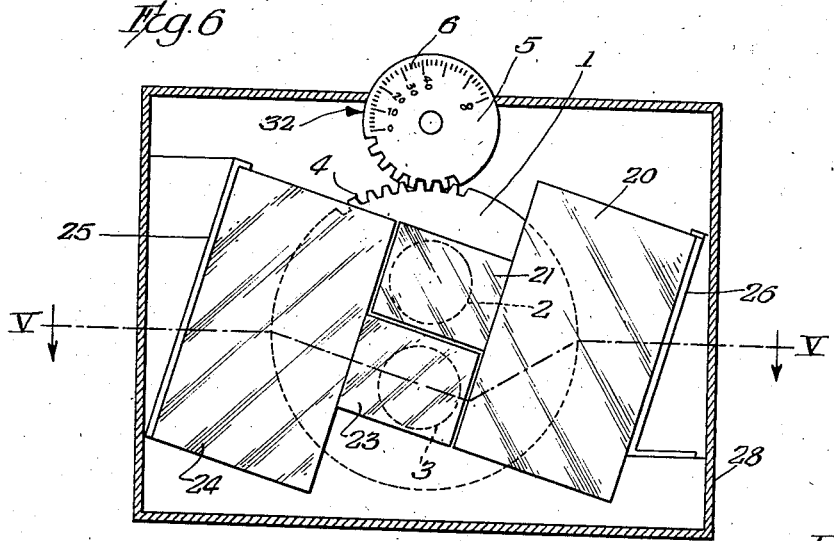
Inventors
Otto Vierling
Fritz Köber
B. Singer & F. Stern
Attys

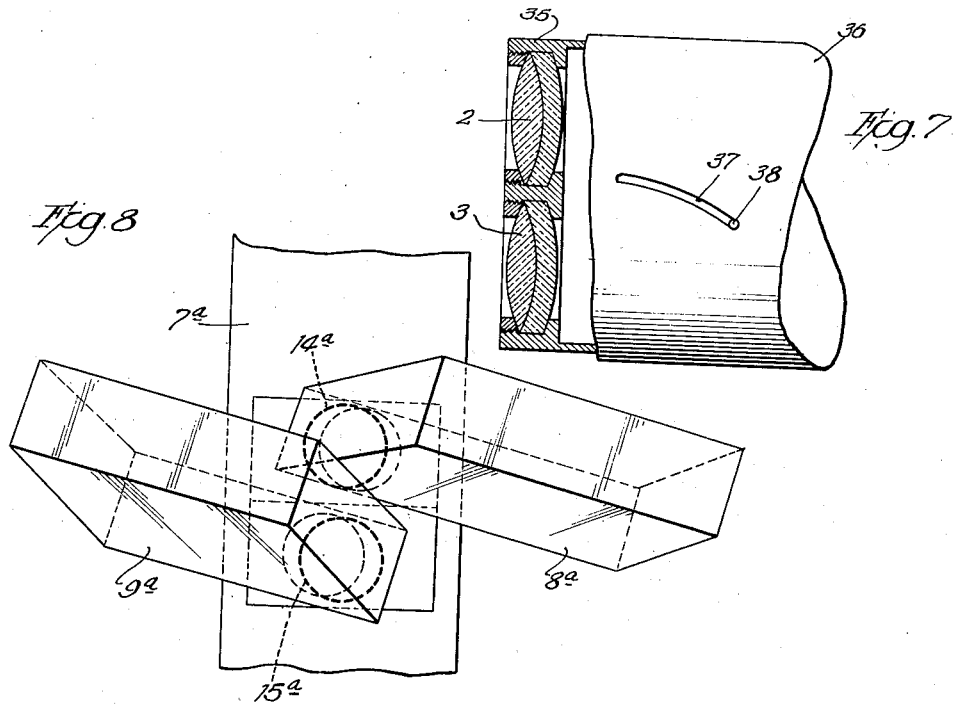

Patented May 6, 1941

2,240,728

UNITED STATES PATENT OFFICE 2,240,728

STEREO CAMERA

Otto Vierling, Dresden-Blasewitz, and Fritz Köber, Dresden, Germany, assignors to Zeiss Ikon Aktiengesellschaft, Dresden, Germany Application November 17, 1938, Serial No. 241,065
In Germany November 19, 1937

3 Claims. (Cl. 95—18)

The invention relates to improvements in stereo cameras and in particular is directed to a novel optical arrangement for stereo cameras employing two photographic objectives.

It has been proposed heretofore to provide a stereo camera having two photographic objectives with adjustable ray deflecting means arranged in the path of each said objectives in order to permit a displacement of the plane of convergence. The plane of convergence is a plane which is positioned in front of the camera parallel to the focal plane of the same and passes through the point of convergence of visual lines coming from the center of the two picture areas in the focal plane and passing through the center of the respective objectives and through the ray deflecting means. For a plane of convergence positioned in infinity these visual lines are parallel to each other, with the exception of those portions, of course, which pass through the ray deflecting means. Such ray deflecting means are employed for the purpose of creating in the eyes of an observer the same impression when he looks at the stereo picture or at the projected stereo picture as natural objects will create when he looks at the same with his two eyes. It also has been proposed to connect the ray deflecting means for one or both beam of lights operatively with the means for adjusting the photographic objective. Such a stereo camera operates then very much like the human eye, in that the convergence of the eyes takes place automatically with the accommodation, or in other words, the convergence is coupled with the focusing of the object to be photographed.

The convergence of the two beams of light in a stereo camera having two objectives may also be varied by varying the distance between the two axes of the objectives. This is usually done by slidably moving the objectives in opposite direction.

The principal object of the present invention is to vary the convergence of the two beams of light in a stereo camera having two objectives by rotatably adjusting a common mount in which both said objectives are mounted. This novel arrangement may be employed in the following cases:

1. When both pictures are produced one on top of the other on a horizontally advanced strip of film without picture rotation by means of objectives which are mounted one above the other. This embodiment of the invention is illustrated by way of example in the accompanying drawings.

2. When both pictures are produced one above the other on a vertically advanced strip of film without picture rotation by means of objectives which are mounted one above the other.

3. When both pictures are produced side by side on a vertically advanced strip of film with rotation of the pictures in the same direction by objectives arranged horizontally side by side.

Another object of the invention is to utilize other methods of photographing in which the convergence may be varied in the manner described.

It is also an object of the invention to keep the displacement of the pictures in vertical direction, which is unavoidable when the common mount of the objectives is rotated to vary the convergence—which vertical displacement is somewhat disturbing when projecting the produced pictures—within the limits of the imperfections of the camera as a whole, so that this displacement will not be noticeable in practice.

With these and other objects in view as will appear hereinafter, the invention shall now be described and claimed with reference to the accompanying drawings, in which Fig. 1 illustrates diagrammatically in front view the two photographic objectives of a stereo camera mounted in a common rotatable mount.

Fig. 5 is a cross-sectional view of a stereo camera along the broken line V—V of Fig. 6.

Fig. 6 is a front view of the stereo camera of Fig. 5, with the front wall of the prism casing removed, and Fig. 7 illustrates in a side view, partly in section the two photographic objectives in a mount which during its rotative adjustment is also moved in axial direction for focusing the objectives.

Fig. 8 illustrates diagrammatically the production of two pictures one above the other on a vertically advanced film.

Figure 1:
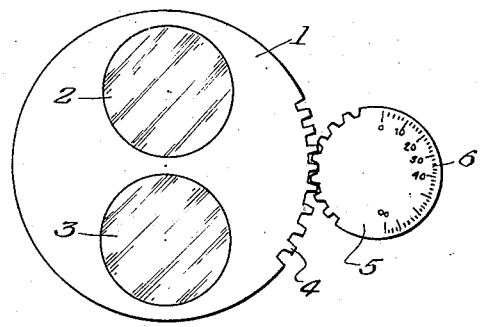
Figure 2:
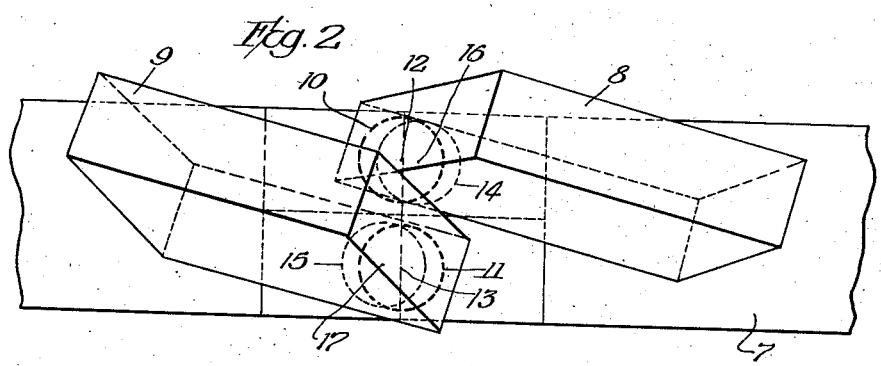
Fig. 2 illustrates diagrammatically the arrangement of two prisms in front of the objectives.
Figure 3:
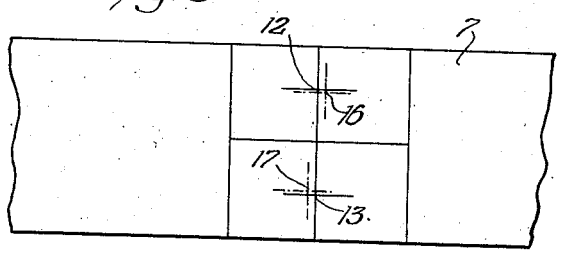
Fig. 3 illustrates diagrammatically the displacement of the center points of the pictures on the film when the common objective mount is rotatably adjusted.

Fig. 1 illustrates a mount 1 which is rotatably attached to the camera and is equipped with two similar photographic objectives 2 and 3, one above the other. The mount 1 is provided with gear teeth 4 on its rim meshing with a manually operable gear 5. Preferably, the gear 5 is provided with a scale 6 indicating the adjusted convergence in units of length, as for instance in feet. As indicated diagrammatically in Fig. 2 the objectives 2 and 3 are positioned between the film 7 on which the two pictures are produced and the two prisms 8 and 9 which are used to provide the base. It is apparent from Fig. 2, that the two prisms 8 and 9 are arranged in such a position to effect a compensation of the height parallax due to the production of the pictures above of the other on the film. The circles drawn in the heavy dotted lines 10 and 11 indicate the position of the objectives 2 and 3 in their zero position. In this zero position their axes are positioned at 12 and 13 respectively. When the mount 1 is rotatably adjusted in clockwise direction the objectives may for instance be moved to the position indicated by the circles 14 and 15 drawn in fine dotted lines. The axes of the objectives will then be located at 16 and 17 respectively. Fig. 3 illustrates more clearly the displacement of the centers of the objectives 2 and 3 from 12 to 16 and from 13 to 17 respectively. It will be noted that a displacement from 12 to 16 and from 13 to 17 results in a considerable variation of the convergence, but the error in vertical direction is very small only.

Figure 4:
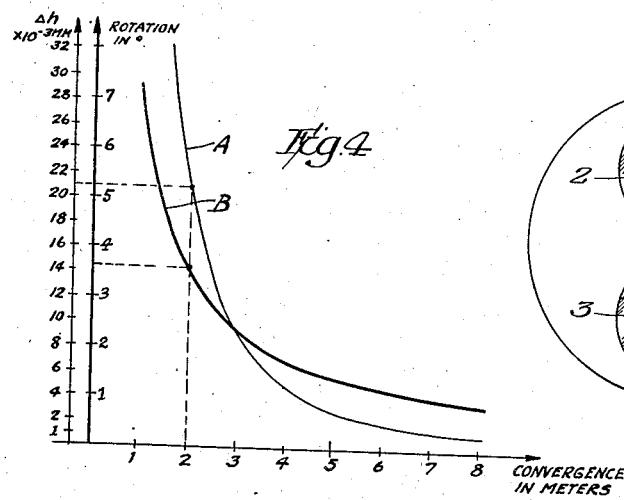
Fig. 4 is a diagram showing the degree of vertical displacement of the picture in dependence of the rotative adjustment of the common objective mount.

A numerical example is illustrated in Fig. 4. The two curved lines A and B indicate the difference in height (A) compared with the rotative adjustment (B) of the mount 1. The diagram of Fig. 4 shows the conditions for objectives having a focal length of 20 millimeters, a base of 66 millimeters and a distance between the objectives of 5.2 millimeters. According to this diagram, a rotative adjustment of the mount 1 of 3.7° will result in a convergence of 2 meters at an error in height of only $21 \times 10^{-3}$ millimeters.

The rotative adjustment of the mount 1 may also be operatively coupled with the focusing device of the two objectives 2 and 3, so that only one adjusting member or device is to be manually actuated.

Fig. 7 illustrates such a modification, in which the mount 35 carrying both objectives 2 and 3 is rotatable in a stationary sleeve member 36 provided with a cam slot 37. A pin 38 on the mount 35 projects into the cam slot 37 which latter controls the axial displacement of the mount with respect to the sleeve member 36 so that the objectives are always focused upon an object positioned in the plane of convergence.

The Figs. 5 and 6 show by way of example a practical embodiment of the invention. In front of each photographic objective 2 and 3 respectively of the stereo camera, whose casing is designated with 19, is arranged a pair of prisms 20, 21 and 23, 24 respectively. Such pairs of prisms are very practical and serve the same purpose as the single prism 8 and 9 shown in Fig. 2. The prisms 20, 21 and 23, 24 are mounted by means of brackets 25, 26 or the like in a holder 28, whose apertured front wall 29 is omitted in Fig. 6. The holder 28 is secured to the front wall 22 of the camera casing 19 by means of a bayonet lock 30.

The mount 1, which carries the two photographic objectives 2 and 3 is rotatably attached at 31 either to the front wall 22 of the camera casing 19, or to the holder 28 of the prism.

The manually operable gear 5 which engages the gear teeth 4 on the rim of the mount 1 is rotatable relatively to an index 32 on the camera casing 19 and the scale 6 on the gear 5 is so graduated to indicate the convergence in units of meters, feet or the like.

In Fig. 5 a light ray 33 has been indicated to show how the same is deflected by the prisms 23, 24 and passes through the objective 3 to the film 34. The other prisms 20, 21 and objective 2 direct the light rays in the same manner ry to the film 34. If desired the prisms 20, 21 and 23, 24 may be made each of a single piece of material.

Fig. 8 illustrates the production of two pictures one above the other on a vertically advanced film 7a. The prisms 8a and 9a are arranged in the same manner as in Fig. 2 with the objectives indicated by the circles 14a and 15a mounted one above the other.

What we claim as our invention is:

1. In a stereoscopic camera, a camera casing having a front wall, two similar photographic objectives having their axes parallel to each other, a mount in which both objectives are mounted one above the other and with their axes parallel to the axis of said mount, means on said front wall for rotatably supporting said mount, the axes of said objectives being equidistant from the axis of rotation of said mount, at least one prism for each of said objectives, said prisms collecting and directing the light entering the camera to their respective objective, so as to produce two pictures from the object photographed, a holder in which said prisms are mounted, means on said holder for attaching the same to the front wall of said camera in a predetermined position and also in such a position that each prism will be supported in front of its respective objective, and manually operable means for simultaneously rotating and axially shifting said mount and the two objectives therein, whereby the distance of the plane of convergence from the camera is made equal to the distance of the object to be photographed from the camera and the objectives are focused on the said object.

2. In a stereoscopic camera, a camera casing having a front wall, two similar photographic objectives having their axes parallel to each other, a mount in which both objectives are mounted with their axes parallel to the axis of said mount, means on said front wall for rotatably supporting said mount, the axes of said objectives being equidistant from the axis of rotation of said mount, a prism for each of said objectives, said prisms collecting and directing the light rays entering the camera to their respective objective, so as to produce two pictures from the object photographed, a holder in which said prisms are mounted, means on said holder for attaching the same to the front wall of said camera in a predetermined position and also in such a position that each prism will be supported in front of its respective objective, and manually operable means for simultaneously focusing said objectives by axially shifting said mount, and shifting the plane of convergence into the plane of the object photographed by rotating said mount.

3. In a stereoscopic camera, a camera casing having a front wall, two similar photographic objectives having their axes parallel to each other, a mount in which both objectives are mounted one above the other and with their axes parallel to the axis of said mount, means on said front wall for rotatably supporting said mount, the axes of said objectives being equidistant from the axis rotation of said mount, at least one prism for each of said objectives, said prisms collecting and directing the light rays entering the camera to their respective objective so as to produce two pictures from the object photographed, a holder in which said prisms are mounted, means on said holder for attaching the same to the front wall of said camera in a predetermined position and also in such a position that each prism will be supported in front of its respective objective, the distance between the incident light beams of said prisms being greater than the distance between the axes of said objectives, and manually operable means for simultaneously rotating and axially shifting said mount with the objectives therein, whereby the distance of the plane of convergence from the camera and the focus adjustment of the objectives is varied, the plane of convergence coinciding with the plane in which the object to be photographed is positioned when the objectives are focused on said object.

OTTO VIERLING.
FRITZ KÖBER.